United States Patent [19]
Hackett et al.

[11] Patent Number: 5,396,157
[45] Date of Patent: Mar. 7, 1995

[54] METHOD AND APPARATUS FOR IMPROVING VERTICAL SHARPNESS OF PICTURE TUBES

[75] Inventors: Andrew D. Hackett, Goxwiller; Werner Boie; Nadine Bolender, both of Strasbourg, all of France

[73] Assignee: Thomson Consumer Electronics, S.A., Courbevoie, France

[21] Appl. No.: 47,415

[22] Filed: Apr. 19, 1993

[30] Foreign Application Priority Data

Sep. 14, 1990 [EP] European Pat. Off. ............ 90402532

[51] Int. Cl.⁶ .................. G09G 1/04; H01J 29/52; H01J 29/56
[52] U.S. Cl. ..................... 315/394; 315/383; 315/370
[58] Field of Search ............... 315/383, 394, 367, 391, 315/370

[56] References Cited

U.S. PATENT DOCUMENTS

| | | | |
|---|---|---|---|
| 2,881,354 | 4/1959 | Keizer | 315/370 |
| 2,902,540 | 9/1959 | Sarson | 315/394 |
| 2,905,855 | 9/1959 | Atti | 315/383 |
| 3,530,237 | 9/1970 | Redington | 348/206 |
| 4,667,135 | 5/1987 | Bristol | 315/371 |
| 4,888,529 | 12/1989 | Madsen et al. | 315/370 |

FOREIGN PATENT DOCUMENTS 3038144  9/1980  Germany .............. H04N 3/30

*Primary Examiner*—Gregory C. Issing
*Attorney, Agent, or Firm*—Joseph S. Tripoli; Joseph J. Laks; Sammy S. Henig

[57] ABSTRACT

Large format TV tubes must produce a high peak brightness in order to be acceptable to the user. This results in a large beam current in bright areas of the picture and in a subsequent defocusing of the resulting spot on the display and in a loss of the sharpness of vertical and horizontal transitions. The apparent sharpness of a vertical transition is gained by modifying the deflection of the TV receiver such that, at vertical transitions, the line on the bright side of the transition is deflected away from the transition region. Advantageously, the amount of vertical scan modulation corresponds to a multi-level control signal and depends on the grey levels of the transition.

10 Claims, 5 Drawing Sheets

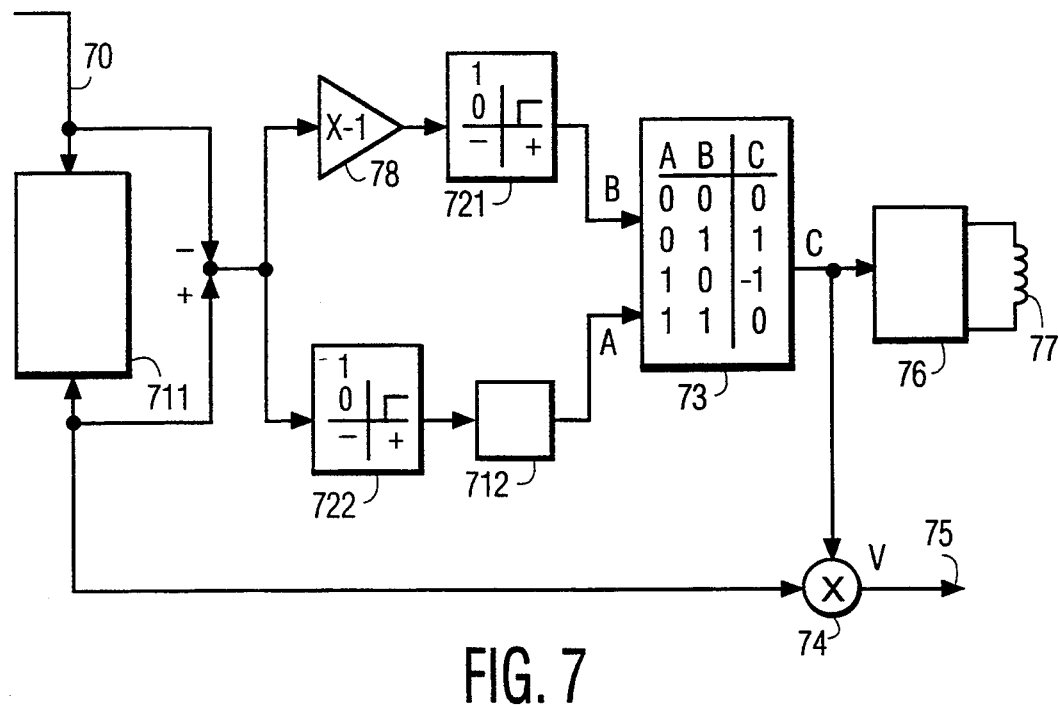
FIG. 7
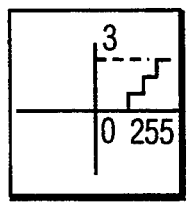
FIG. 8a
| B \ A | 0 | 1 | 2 | 3 |
|---|---|---|---|---|
| 0 | 0 | -0.33 | -0.66 | -1 |
| 1 | 0.33 | 0 | 0 | 0 |
| 2 | 0.66 | 0 | 0 | 0 |
| 3 | 1 | 0 | 0 | 0 |
FIG. 8b

METHOD AND APPARATUS FOR IMPROVING VERTICAL SHARPNESS OF PICTURE TUBES

This is a continuation of PCT application PCT/EP 91/01702, filed Sept. 6, 1991 by Andrew Hackett, Werner Bole and Nadine Bolender and titled "Method And Apparatus For Improving Vertical Sharpness Of Picture Tubes.

The present invention relates to a method and an apparatus for improving vertical sharpness of images displayed on picture tubes.

BACKGROUND

Large format TV tubes must produce a high peak brightness in order to be acceptable to the user. This results in a large beam current in bright areas of the picture and in a subsequent defocussing of the resulting spot on the display. FIG. 1 illustrates this effect. The horizontal axis 10 scales the vertical line distances and the vertical axis scales the brightness amplitude. A high brightness spot 12 has a significantly increased diameter compared to a low brightness spot 13. The sharpness of a transition between bright and dark areas is therefore impaired due to an overlapping of the bright spot 22 into a dark region as shown in FIG. 2. The dashed line 25 shows the overall response and the hatched area is a region of impairment 24, whereby line 26 marks the position of the edge in the picture.

INVENTION

It is an object of the invention to improve the apparent vertical sharpness in transitions between bright and dark picture areas when displayed on TV tubes.

This object will be reached by the features of claim 1. Advantageous additional embodiments are described in the subclaims.

A picture improvement method using a modified vertical deflection is described in the article "Line Flicker Reduction by Adaptive Adjustment of Vertical Deflection in TV Receivers", H. A. Petersen, H. D. Bach,. R. Nielsen, IEEE 1990 ICCE Proceedings, FAM 17.3, Jun. 1990. Apparent line flicker is reduced by adaptive adjustment of the vertical deflection. But sharpness impairments caused by varying dot sizes are not eliminated.

An improvement in the apparent sharpness of a vertical transition may be gained by modifying the vertical deflection of a TV receiver such that, at vertical transitions, the line on the bright side of the transition is deflected away from the transition region as shown in FIG. 3. This additional deflection may be provided by means of an additional amplifier and deflection coil on the TV tube. The amount of deflection illustrated in FIG. 3 is of the order of one scan line, but may be less depending upon the characteristics of the display tube. The amount of deflection may also be varied depending upon the characteristics of the video signal, but primarily additional deflections are carried out with a fixed distance either up or down.

DRAWINGS

Preferred embodiments of the invention will now be described with reference to the accompanying drawings, in which:

FIG. 7 is an alternative implementation using one full and one 1-bit line delay;

FIG. 8 shows the principle modifications for 4-(or greater-) level comparisons;

PREFERRED EMBODIMENTS

Figure 1:
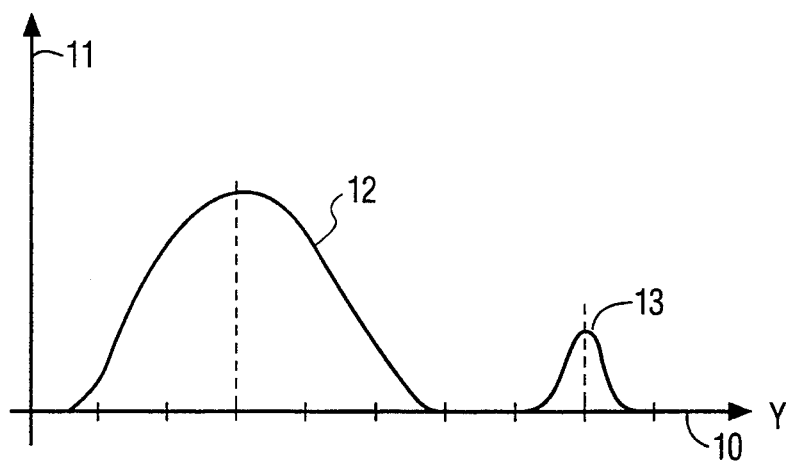
FIG. 1 is a different-amplitude spot profile.
Figure 2:
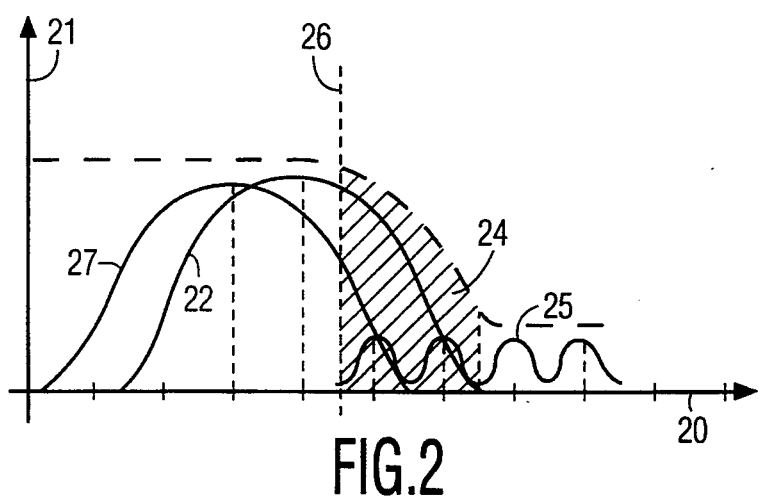
FIG. 2 shows edge blurring caused by a high brightness spot.
Figure 3:
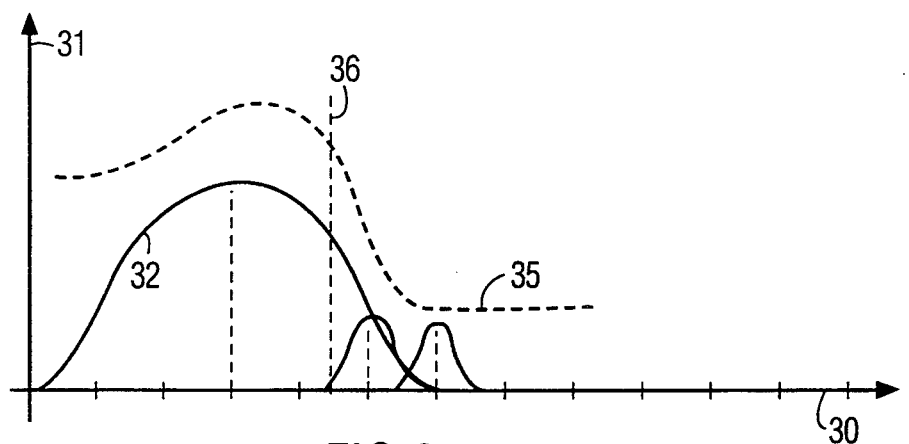
FIG. 3 shows the edge when using the scan modulation according to the invention.

Due to the additional vertical deflection in FIG. 3 the spot 22 in FIG. 2 has now the same location as spot 27 in FIG. 2, so that in FIG. 3 there is only one high brightness dot 32. Superimposing of the both dots results in a higher overall response 35 at this line. The brightness gradient at the edge has increased. A dashed line 36 again marks the edge position. This method also improves picture quality if the field frequency is higher than 50 or 60 Hz.

Figure 4:
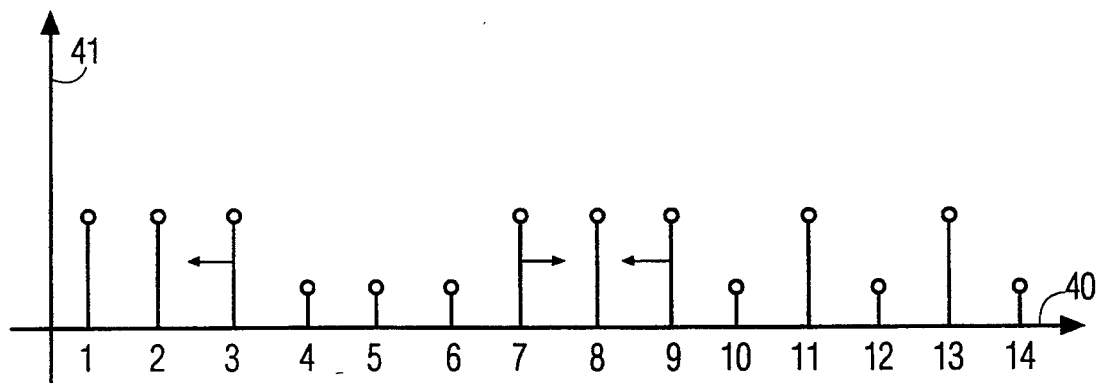
FIG. 4 is an example of a vertical cross section of a TV signal.

An example of a vertical cross-section through an image is shown in FIG. 4. Each line and point represents the amplitude of the video signal at one pixel on each line 1–14 of the cross-section. It can be seen that in order to improve the display the scan on lines 3, 7, and 9 should be deflected in the direction indicated by the arrows. Transitions also exist at lines 11 and 13, but as this represents a high vertical frequency, no improvement can can be made by modifying the scan, and so the lines should remain undeflected.

Figure 5:
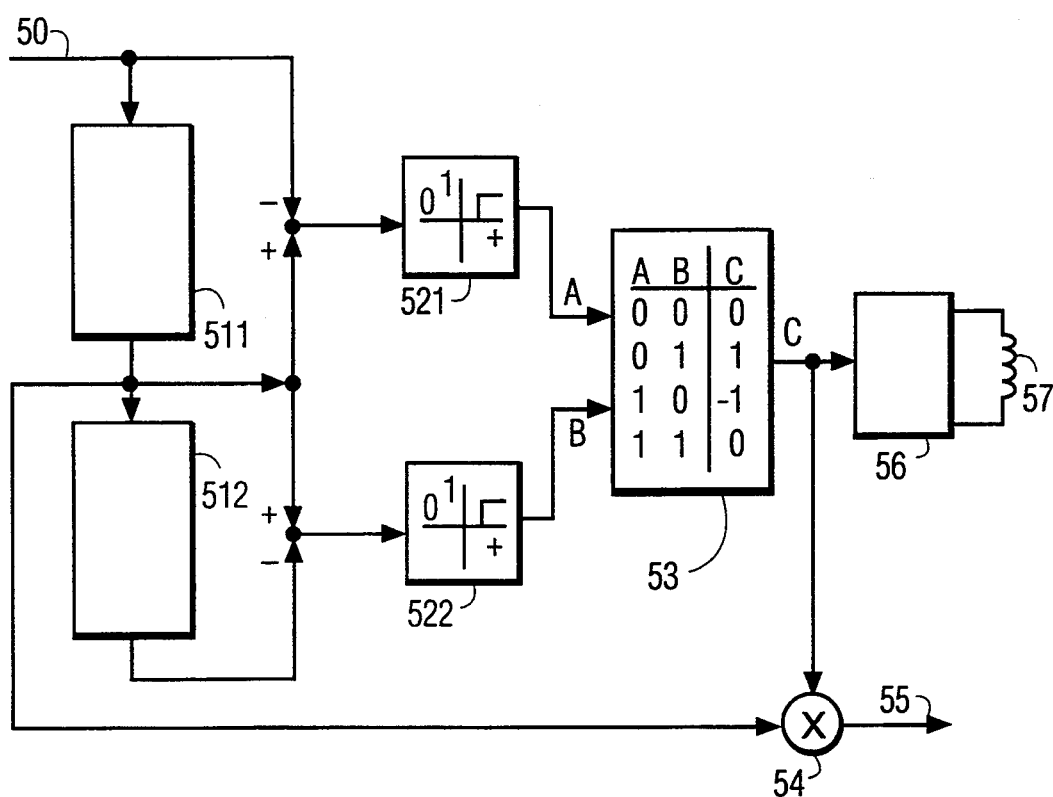
FIG. 5 is a block diagram of a control signal generator.

A block diagram of a system to implement this processing is shown in FIG. 5. The incoming video signal 50 is passed through two line delays 511 and 512 to give access to the line following (at the input of the first line delay 511) and to the line preceding the current line. The line preceding is available at the output of the second line delay 512 and the current line is available at the output of the first line delay 511. Differences are formed between the current line and the following line and between the current line and the previous line. These differences are then passed to a first comparator 521 and to a second comparator 522, respectively, where they are thresholded and converted to binary signals A and B. Then they are combined in a logic circuit 53 to form an output control signal C. The video signal at the output of the first line delay 511 is fed to an amplifier or multiplier 54, respectively. The gain of this amplifier 54 is controlled by signal C. If C is "0", the gain of amplifier 54 is 1.0, if C is not "0", the gain is about 0.9 in order to reduce the brightness at its output 55. Signal C is also directed to a deflection circuit 56 which supplies a vertical deflection coil 57.

Figure 6:
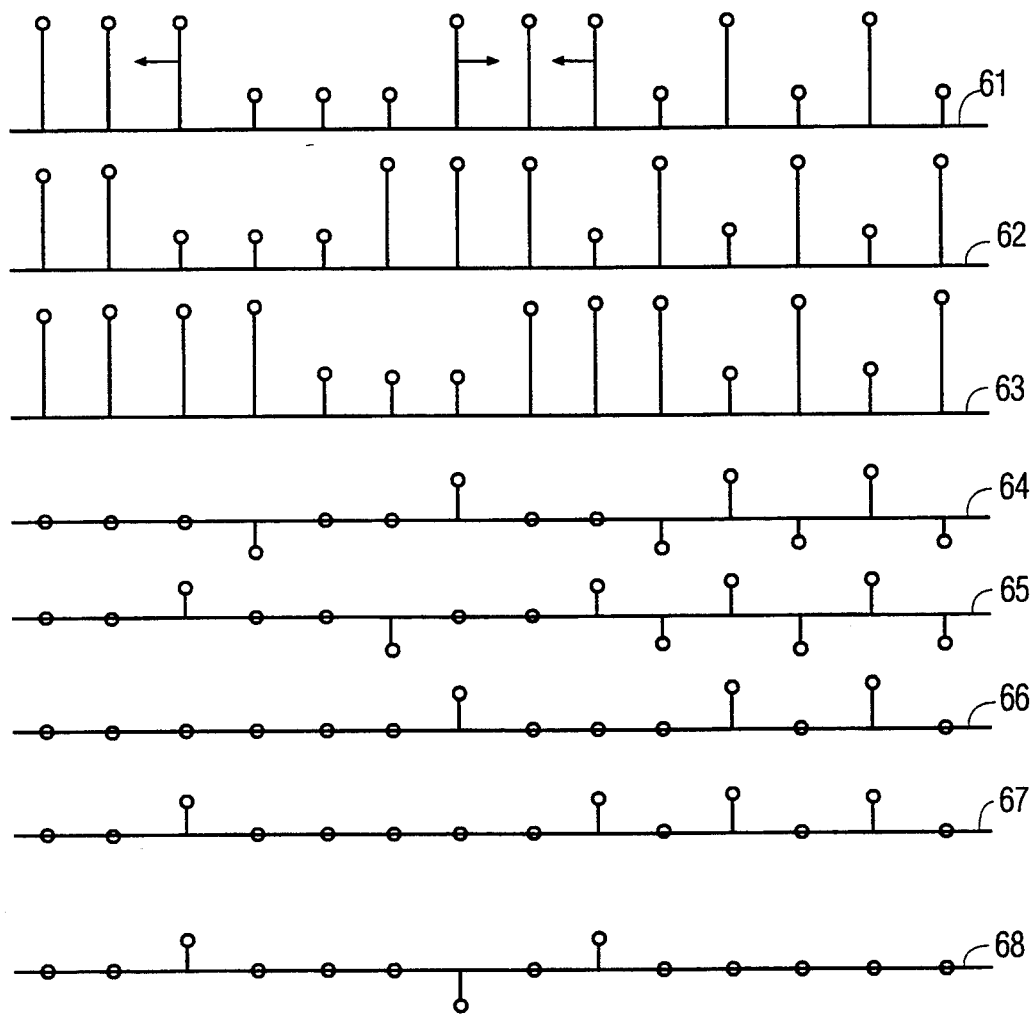
FIG. 6 shows waveforms associated with FIG. 5.

FIG. 6 shows the values of the signals through the processing for the example cross-section of FIG. 4, at the point when this signal 61 appears at the output of the first line delay 511. Signal 63 at the input of the first line delay 511 and and signal 62 at the output of the second line delay 512 appear one line later and earlier, respectively. The difference signals 64 and 65 after thresholding appear at points A and B. It can be seen that point A indicates a signal 66 of lines which should be shifted upwards and point B indicates a signal 67 of lines which should be shifted downwards. Both signals 66 and 67 indicate the same lines in the area of high detail. To provide a control signal output, the signals 66 and 67 are applied to a look-up table in logic circuit 53. The output of this circuit is +1 if only signal A is active or −1 if only signal B is active. If both signals A and B are "0" (no edge detected), or both "1" (a single bright line), output is "0" as no improvement can be made by modifying the deflection.

An alternative implementation using only one full resolution video line delay 711 is shown in FIG. 7. In this implementation the signals 70, 75, A, B, C and the circuits 711, 721, 722, 73, 74, 76 and the coil 77 correspond to the signals 50, 55, A, B, C, and the circuits 511, 521, 53, 54, 56, and the coil 57 in FIG. 5. An unity gain inverting amplifier 78 is added, but the line delay 712 has only 1-bit resolution. The 1-bit control signal at the output of the second comparator 722, corresponding to signal A in FIG. 5, is delayed by one line before being applied to the lookup table within logic circuit 73.

When the control signal C deflects the scanning beam, this results in perceivable increase in brightness on the display for the part of the image for which the original and deflected parts of scan lines overlap. For both implementations, a reduction of the amplitude of the video signal within switched gain amplifier 54, 74 may be made when the control signal C is active. If the reduction in brightness is too great, visible edge busyness results along contours near the threshold. A value of about 0.9 appears to provide a good compromise between edge busyness and a suitably reduced increase in brightness of the overlapping parts of the scan.

At the expense of greater hardware complexity in the line delays and decision circuitry, the control signal C can be made to have an amplitude depending on the video contour. Then the output of the comparators 521, 721, 522, 722 is a multi-level signal, which is applied to the logic circuit 53, 73. An example transfer characteristic of a 4-level comparator is shown in FIG. 8a. Obviously, the 1-bit line delay 712 in FIG. 7 now requires the number of bits necessary to represent the comparator output. The look-up table in logic circuit 53, 73 is now expanded and is shown in tabular form in FIG. 8b. To illustrate the principle, comparator outputs with 2-bit resolution are shown. Essentially, the control signal C increases in proportion with the comparator's values for the case of a single edge. In the case of high frequency detail (output from both comparators at A and B) the control signal is inhibited in the normal way.

Control signal C can also be obtained by using the information available during a field rate upconversion process.

Figure 9:
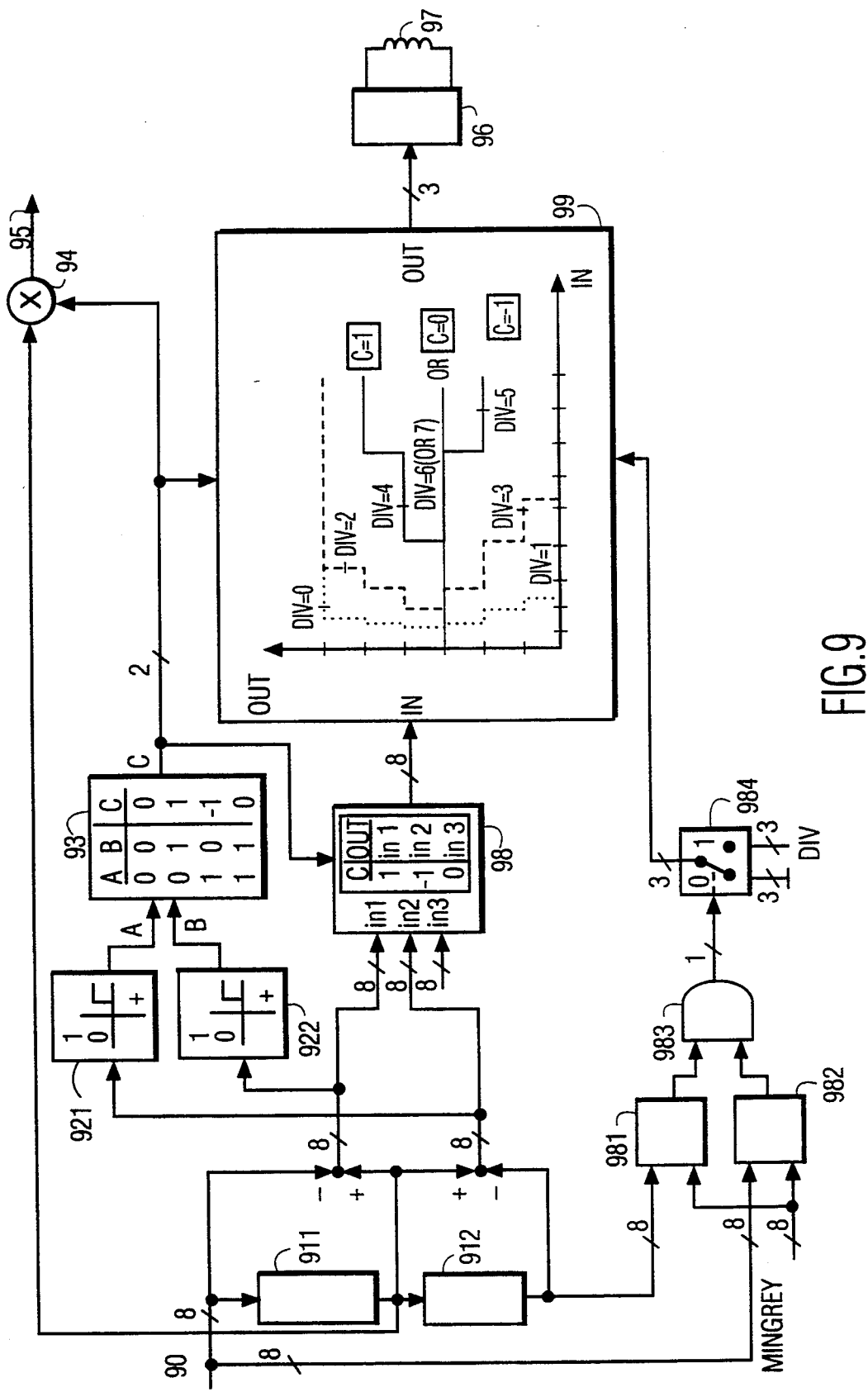
FIG. 9 shows a block diagram of an improved control signal generator.

FIG. 9 depicts a block diagram on basis of the block diagram of FIG. 5. Incoming video signal 90, line delays 911 and 912, comparators 921 and 922, logic circuit 93, amplifier 94, deflection circuit 96 and deflection coil 97 respect the corresponding circuits and signals of FIG. 5. The output control signal C generated in logic circuit 93 is fed also to a second logic circuit 98 and to staircase circuit 99. Deflection circuit 96 is not controlled by output control signal C but by the according output signal OUT of staircase circuit 99. The inputs of comparators 922 and 921, respectively, are connected to the inputs IN1 and IN2, respectively, of second logic circuit 98. The output of this circuit is either the signal at input IN1 or at input IN2 or at input IN3 (=0) and is fed with relation to output control signal C to input IN of staircase circuit 99. The output of second line delay 912 is fed to a third comparator 981 and input video signal 90 is fed to a fourth comparator 982. The second input of each of these comparators is connected to a voltage MINGREY. The output signals of these comparators are inputted to an AND circuit 983 which is connected to a switch 984. The output signal of switch 984 is also fed to staircase circuit 99.

The applied additional vertical deflection (of ±1 line) may destroy the equally spaced scanning grid and introduces holes at the darker side of a transition after the postfiltering by the beam current. Obviously these holes remain unvisible if at the darker side of the edge the beam current remains nearly zero. But for grey levels the holes coming up may be annoying. This effect becomes even more disturbing if the vertical transition extends not over one but two lines as it is the case after a vertical upconversion by an interpolating filter. With an interpolated value halfway between the value of both sides of the edge corresponds a smaller cross section of the electron beam and therefore less overlapping with the adjacent lines. Therefore in case of vertical transitions between grey and white levels the deflection amplitude will be reduced. Although the holes cannot be avoided a good compromise between edge enhancement and artefacts can be achieved with a circuit according to FIG. 9. Depending on the actual values of output control signal C, of the signal at input IN and the output signal of switch 984 different staircase functions are generated within staircase circuit 99. The signal at input IN represents the transition amplitude. When this amplitude increases continuously the signal at output OUT will increase stepwise if C>0 or C<0. If one or both input signals of the third and the fourth comparators 981 and 982 are less than voltage level MINGREY the output signal of switch 984 will be zero, i.e. graph 'DIV=0' in staircase circuit 99 is valid. If both comparator input signals are greater than MINGREY the output of AND circuit 983 will go high and switch 984 passes a dividing value DIV>0 to staircase circuit 99. According to value DIV the slope of the generated staircase function is changed. Six different graphs (one half of each graph, the graphs are symmetrical to axis OUT=0) corresponding to value DIV are shown in FIG. 9. If DIV≧6, the signal at output OUT is zero regardless of the level at input IN. Preferred values are: MINGREY=160 . . . 200 within the full range 0 . . . 255 (8 bit) of video signal 90

DIV=2

For improving noise immunity with respect to output control signal C this signal can be a multilevel control signal of at least three bit resolution in conjunction with an horizontal low pass filter. Thereby 'busy edges' are avoided. The line delays, comparators, logic circuits and the staircase circuit are then made matching for such higher resolution. In order to also avoid an additional deflection in uniform picture parts, which can happen due to transients of a usual lowpass filter after the electron beam has passed a horizontal edge, an edge preserving filter, e.g. a median filter, is applied (not depicted).

We claim:

1. Method for improving an apparent vertical sharpness of pictures displayed with a line structure on a picture tube, by a beam that is deflected in a vertical direction, comprising the step of, additionally deflecting the beam in the vertical direction by an amount that is determined in accordance with brightness-depending variations of a spot size of displayed lines, whereby the beam is deflected towards a bright side of a transition region formed by line segments having brightness transitions in the vertical direction such that the direction of said additional deflection in a given vertical deflection cycle is unaffected by an order of said vertical deflection cycle within a sequence of vertical deflection cycles.

2. Method according to claim 1 characterized in that said additional deflection is made using an additional deflection coil.

3. Method according to claim 1 characterized in that said additional vertical deflection is active if said bright area has a height of more than one line.

4. Method according to any of claims 1 characterized in that the amount of said additional vertical deflection relates to the slope of said transition.

5. Method according to any of claims 1 characterized in that the amount of said additional vertical deflection relates to the difference in brightness between the two sides of said transition.

6. Method according to claim 1 characterized in that the amount of said additional vertical deflection is a staircase function of the difference in brightness between the two sides of said transition.

7. Apparatus using a method according claim 1 wherein said apparatus comprises two serially connected line delays responsive to a video signal containing picture information that is coupled to an input of one of said line delays, each of said line delays being followed by subtraction means for forming for each field a difference signal between the input and an output of said line delays, each of which is fed to a comparator which forms binary output signals whereby said output signals are combined in logic circuit means and a control signal consisting of at minimum three levels is formed therein, said control signal being used for generating said additional vertical deflection for line segments at vertical brightness transitions, said control signal being coupled to a first input of a multiplier and the output of the first line delay being coupled to a second input of the multiplier for generating an output signal of said multiplier that reduces the brightness amplitude at the bright side of said transition.

8. Apparatus according to claim 7 wherein the second of said line delays is located between the second of said comparators and said logic circuit means.

9. Apparatus according to claim 7 wherein said comparators generate said output signals with more than two levels and that said logic circuit means accordingly generate said control signal with more than three levels.

10. Apparatus according to claim 7 wherein said control signal is fed to a staircase circuit wherein said control signal is changed corresponding to the difference in brightness between the two sides of said transition.

* * * * *